United States Patent [19]

Fahy et al.

[11] Patent Number: 5,071,395
[45] Date of Patent: Dec. 10, 1991

[54] DIFFERENTIAL GEAR MECHANISM

[75] Inventors: Arthur J. Fahy, Double Bay; Neil Gillies, Earlwood, both of Australia

[73] Assignee: IVG Australia Pty. Limited, Bankstown, Australia

[21] Appl. No.: 590,239

[22] Filed: Sep. 28, 1990

[30] Foreign Application Priority Data

Sep. 28, 1989 [AU] Australia .............................. PJ6634

[51] Int. Cl.⁵ ............................................. F16H 1/38
[52] U.S. Cl. .................................. 475/226; 475/227; 475/220; 475/221
[58] Field of Search ................ 475/226, 227, 220, 221

[56] References Cited

U.S. PATENT DOCUMENTS

| | | | |
|---|---|---|---|
| 1,164,769 | 12/1915 | Walter | 475/227 |
| 1,252,388 | 1/1918 | Bickley | 475/226 |
| 2,900,846 | 8/1959 | Lehman | 475/227 |
| 3,095,761 | 7/1963 | Hilado | 475/227 |
| 3,292,456 | 12/1966 | Saari | 475/226 |
| 3,899,939 | 8/1975 | Hilado | 475/226 |
| 4,677,535 | 5/1987 | Knight | 475/226 |
| 4,677,876 | 7/1987 | Dissett | 475/226 |
| 4,938,099 | 7/1990 | Knight | 475/226 |

FOREIGN PATENT DOCUMENTS

| | | | |
|---|---|---|---|
| 0678249 | 1/1964 | Canada | 475/227 |
| 0768330 | 8/1934 | France | 475/227 |
| 2611015 | 8/1988 | France | 475/227 |
| 2611016 | 8/1988 | France | 475/226 |
| 2621092 | 3/1989 | France | 475/226 |
| 8801355 | 2/1988 | PCT Int'l Appl. | 475/226 |
| 0027123 | 4/1912 | United Kingdom | 475/226 |

Primary Examiner—Leslie A. Braun
Assistant Examiner—Daniel Wittels
Attorney, Agent, or Firm—Dellett, Smith-Hill and Bedell

[57] ABSTRACT

A differential mechanism is provided with two output shafts 202 and 204 coaxially arranged and extending to wheels 203 and 205 of a vehicle. The differential is provided with a pair of connected discs 221, 209, the disc 209 being rotated about the common axis of the shafts 204, 202 by a drive shaft 206 and a pinion. An intermediate shaft 211 is eccentrically positioned between the two discs 209, 221 and is formed with a circumferentially extending spiral tooth 241. The tooth 241 engages a driving gear 217 fixed to the shaft 202 at one end-portion and the other end-portion of the member 240 provides a member in mesh with the second member 216 fixed to the shaft 204. The teeth of the members 216 and 240 are shaped and positioned so that drive between them is inefficient but they will translate over one another if the member 216 is rotated in the same direction and at the same speed as the member 240. This occurs when the vehicle is cornering and one wheel is increasing in speed while the other is reducing its speed. In the situation, where one wheel loses ground adhesion, the differential prevents that wheel from racing and removing drive torque from the other wheel.

10 Claims, 6 Drawing Sheets

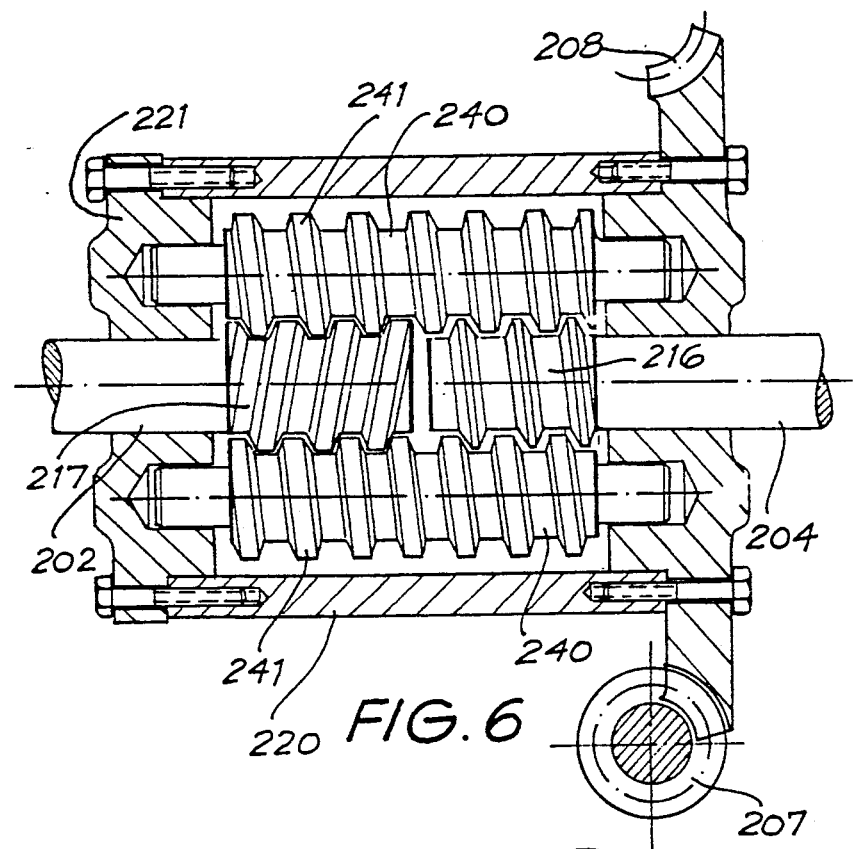
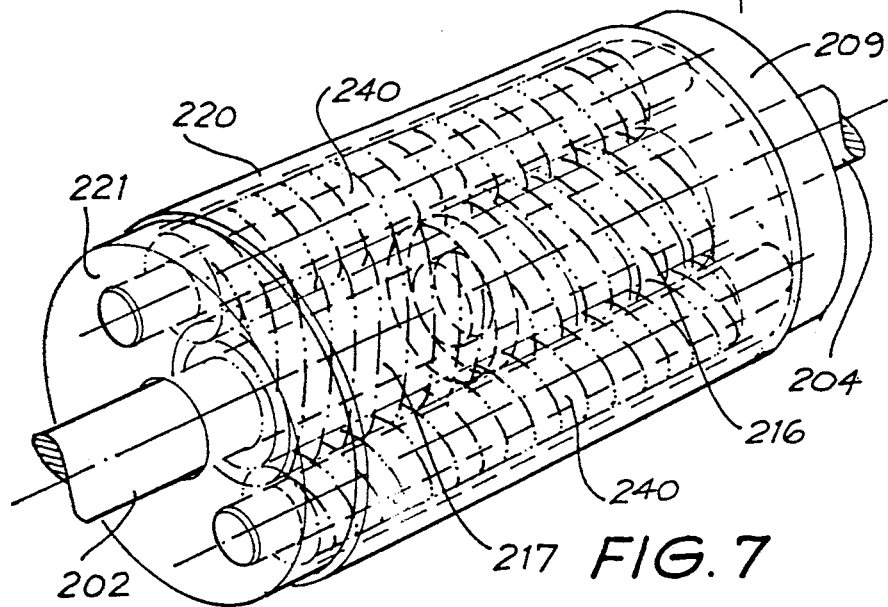

DIFFERENTIAL GEAR MECHANISM

FIELD OF INVENTION

This invention relates to a differential gear mechanism and is more specifically, although not exclusively concerned with one for use in a road vehicle.

STATE OF THE ART

Conventionally, the wheels of a car are driven by a power take-off shaft which drives the wheels through a simple form of differential gear box. The differential gear includes usually a pair of spaced and opposed face gears interconnected by bevel gearing which is turned by a crown wheel.

When the vehicle corners, the wheel on the outside of the corner turns faster than the wheel on the inside of the corner. The differential gear mechanism allows this to occur.

A problem encountered with the simple differential gear mechanism described above is that, should one wheel spin freely, as occurs if it encounters ice or a road film on the road, or if it is lifted into the air, there is an immediate loss of driving torque on the other wheel still in non-slipping contact with the ground. In high performance cars and racing cars, this cannot be tolerated because the sudden loss in power can result in loss of control of the car. In low performance cars and vehicles, the above condition leading to a power loss is rarely encountered if the vehicle is driven in a normal fashion, and its relatively rare occurrence seldom leads to an accident and is accepted as a normal driving risk.

High performance cars and racing cars are equipped with special differential gear mechanisms for preventing a loss of driving torque in the event of ground adhesion being temporarily lost by one wheel. One such gear mechanism is the "TORSEN" differential (described in 'Popular Mechanics', December 1988, at page 106). The TORSEN differential enables both wheels to continue to be driven despite a loss of ground adherence by one wheel. However the TORSEN differential is expensive, complex in construction and has a relatively short life. It is for these reasons not fitted to normal road vehicles.

OBJECT OF THE INVENTION

An object of this invention is to provide an improved differential gear mechanism.

SUMMARY OF THE INVENTION

In accordance with the present invention there is provided a differential gear mechanism having two output shaft connections turning about a common axis of rotation interconnected by gearing which includes: an externally geared intermediate shaft extending parallel to said common axis; an input drive connection driving the intermediate shaft around an orbital path concentric with said common axis; a first tooth meshing zone formed between externally-toothed members one of which is connected to one of the output shaft connections and the other of which is connected to the intermediate shaft; and, a second tooth meshing zone formed between externally toothed members one of which is connected to the other of the output drive connections and the other of which is connected to the intermediate shaft; in which mechanism the teeth in one of the two meshing zones have the same spiral hand and are shaped and positioned to provide zero or a low efficiency of drive between them, the members defining one of the meshing zones turn in the same direction as one another, and the members defining the other of the meshing zones turn in opposite directions to one another.

PREFERRED FEATURES OF THE INVENTION

The differential may use four separate external gear members. However, for ease of manufacture, it is preferred to have on the intermediate shaft a toothed portion of extended length so that it can provide, with different sections of its length, one of the members of each of the two meshing zones. It is preferred, in such an arrangement, to have the remaining members of the two meshing zones provided with teeth which respectively spiral opposite handedly. In order to avoid backlash in the mechanism, the axial thickness of the spiralling tooth of one of the said remaining members is greater than the axial thickness of the spiralling tooth of the other member.

The teeth of the members may be single start or multi-start. Preferably the intermediate shaft is replicated about said common axis.

The gear mechanism of the invention exhibits the same advantageous properties as the TORSEN mechanism mentioned above, but is simpler and cheaper to construct and therefore has a wider application to road vehicles. However the mechanism of the invention should not be regarded as being confined to differential gearing for vehicles as it is applicable to many forms of gearing as well as those used in vehicles, and also can be used as a drive splitter in a four wheel vehicle, for example.

Amongst the advantages of the differential gear mechanism of the invention over the TORSEN differential are that the helical or spiral teeth can be designed to mesh with a line contact. This is not possible with the crossed helical gears as used in the TORSEN differential and causes the latter mechanism to have inferior wear characteristics. If locking of the members does not take place completely, i.e. they are not 100% inefficient, thus permitting some small relative rotation to occur between them, it is possible to build into the mechanism of the invention a degree of inefficiency which will allow the output drive shaft connections to turn freely over a limited range of variations in their rotational speeds.

INTRODUCTION TO THE DRAWINGS

The invention will now be described in more detail, by way of examples, with reference to the accompanying drawings which are diagrammatic and largely schematic, and in which:

IN THE DRAWINGS

FIG. 6 is a vertical section through a practical embodiment of the arrangement of FIG. 5;

FIG. 7 is a perspective layout of the components of FIG. 6;

DESCRIPTION OF THE FIRST EMBODIMENT

Figure 1:
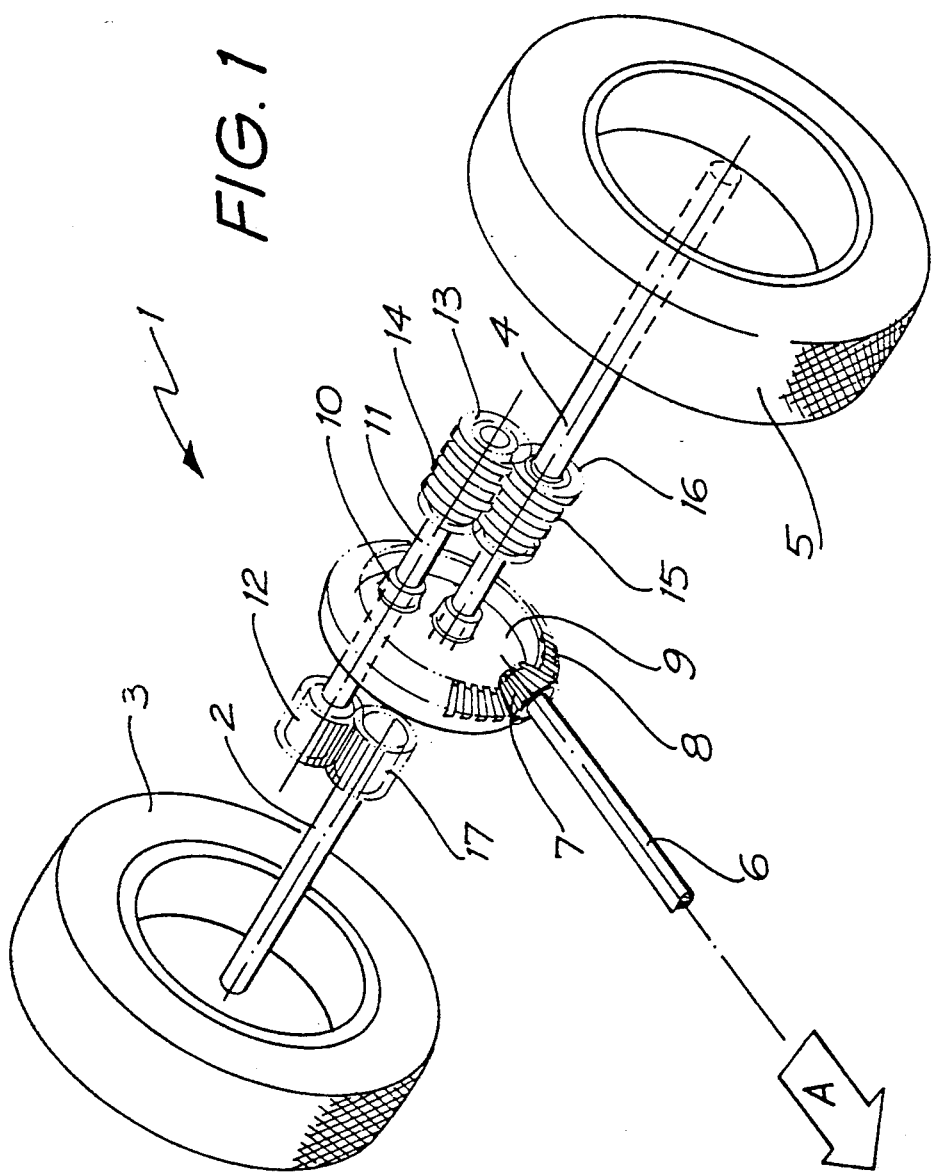
FIG. 1 is a perspective view of a first differential gear mechanism for use in a car.
Figure 2:
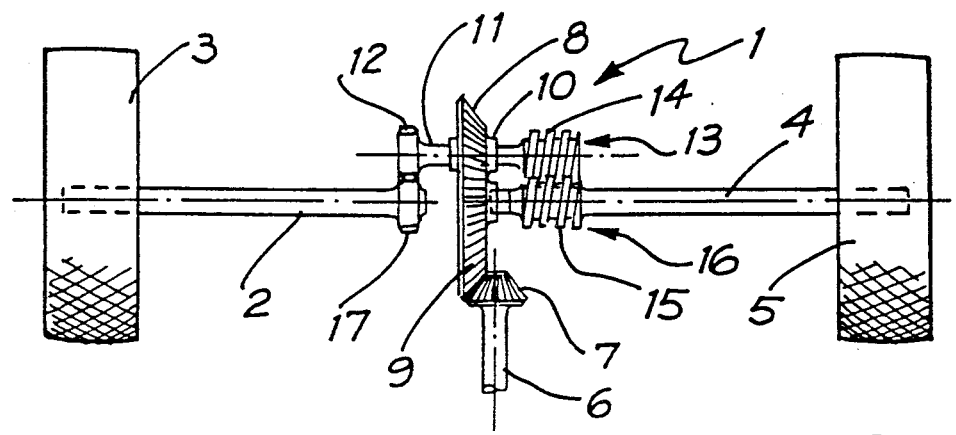
FIG. 2 is a front view of the mechanism shown in FIG. 1.
Figure 3:
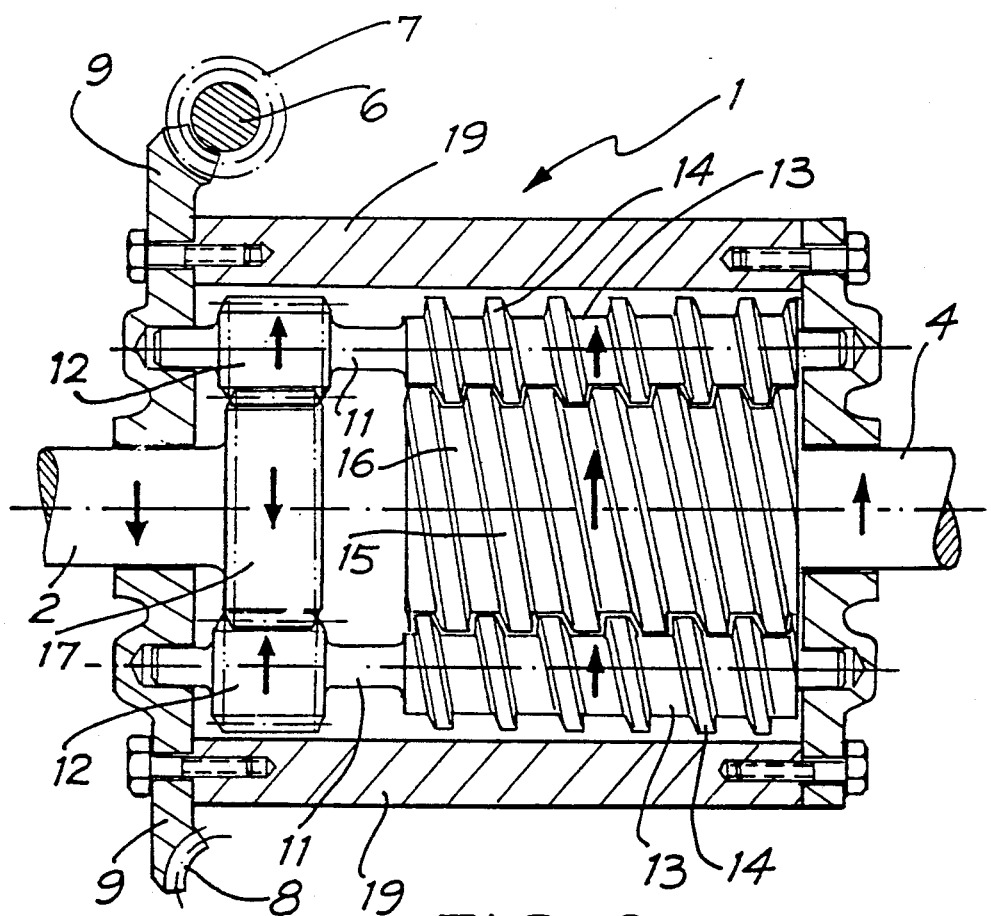
FIG. 3 is a vertical section through a practical embodiment of the mechanism shown in FIGS. 1 and 2.

In FIGS. 1, 2 and 3, a vehicle differential mechanism 1 is connected by a shaft 2 to one rear wheel 3 of the vehicle, and by a shaft 4 to the other rear wheel 5 of the vehicle. A drive shaft 6 provides power to the wheels 3 and 5 and has a pinion gear 7 which engages a rim gear 8 on a rotary disc 9 centred on the common axis of the shafts 2 and 4, and forming part of a cylindrical casing 19, shown in FIG. 3.

Returning to FIG. 1, the disc 9 has an offset hole 10 through which passes an intermediate shaft 11 carrying, on one end, a gear 12, and on the other end, a helically toothed rotary member 13. The tooth of the member 13 is referenced 14 and meshes in a first meshing zone with helical tooth 15 formed on a second and axially parallel rotary member 16 which is shown as of the same diameter as the member 13. The member 16 is connected to the end of the shaft 4 inside the casing 19. The teeth 14 and 15 have the same spiral hand.

The gear 12 meshes in a second meshing zone with a second gear 17 attached to the inner end of the second wheel shaft 2. As is apparent from comparing FIGS. 1 and 3, it is not essential for the diameter of the meshing members 13 and 16 to be identical, however, it is essential for their speed ratio to be the same as the speed ratio of the meshing gears 12 and 17. In the working configuration shown in FIG. 3, there are two intermediate shafts 11. However the intermediate shaft 11 may be replicated several times, if desired, around the axis of the gear member 15. The shape and profile of the helical teeth 14 and 15 is such that they will translate smoothly if the direction in which the member 13 rotates about the axis of the shaft 11 is the same as the direction in which the member 16 rotates, and both members rotate at the same speed. The teeth on the members 13 and 16 have the same spiral hand and are inefficient so that they rub against one another as their flank surfaces travel across the meshing zone in opposite directions, respectively. There is thus a large frictional resistance created between the continuous flank surfaces of the teeth of the members 13 and 16, and this produces the poor efficiency between the members. The poor efficiency can be adjusted as desired to give the differential the required operating characteristics, by using a technique explained in more detail below with reference to FIG. 4.

OPERATION OF THE FIRST EMBODIMENT

The differential operates as follows.

Assume firstly that the vehicle is allowed to roll freely in a straight line. The road wheels 3 and 5 rotate in the same direction and at the same speed. The reversing action of the gear wheels 17, 12 attempts to turn the member 13 clockwise. At the same time, the member 16 is being urged counterclockwise by the wheel 5. As the member 13 can only rotate in the same direction as the member 16, no relative rotation will occur between them. The rotation of the drive shaft 6 thus produces orbital movement of the shaft 11 around the axis of the shafts 2 and 4 without shaft 11 rotating about its own axis, and the vehicle's wheels are driven in synchronism in normal manner.

For a motor vehicle differential, it is preferred to have a very poor efficiency rather than complete locking together of the members 13 and 16. However in other applications of differentials, complete locking (i.e. zero efficiency) may be preferred and is obtainable with the invention by suitably shaping the teeth 14, 15.

Now consider the case of the vehicle turning a left-hand corner. This may be simulated by ignoring the road speed of the vehicle and turning the wheel 5 clockwise while turning the wheel 3 counterclockwise at the same speed. The wheel 3, being on the outside of the corner, now turns faster by an angular velocity increment than the wheel 5 which is slowed down by the same angular velocity increment. The counter-clockwise rotation of the wheel 3 is converted into a clockwise rotation of the member 13 through the gears 12 and 17. The two members 13 and 16 now turn in the same direction and at the same speed. As the teeth 14 mesh with the teeth 15, they permit the desired differential movement, and this is accompanied by rotation of the shaft 11 in the hole 10 in the face gear disc 9.

Finally, consider the situation when one wheel, say wheel 3, loses road adhesion. This may occur as a result of it encountering ice or oil on the road. With a conventional differential using three bevel gears, drive will be lost as the input torque to the differential simply causes spinning of the affected wheel 3 and the traction disappears from the wheel 5. This condition can be dangerous in a high-performance car and is avoided by using one of the sophisticated expensive differential gear systems mentioned in the introduction to this specification. It is also avoided with the differential system being described for the following reasons.

With fully-locking or zero efficiency between toothed members 13, 16, a loss of road resistance of the wheel 3 when the vehicle is travelling in a straight line, has no effect on its rotation as the drive from the shaft 6 to the disc 9 is transmitted via the offset shaft 11 and the members 13 and 16 are locked together. The members 13, 16 only become unlocked if they are driven in the same direction at the same speed. In the situation being postulated, wheel 5 is still being driven at the road speed and therefore the condition for freeing the members 13 and 16 never arises. Instead, the input power of the shaft 6 is transmitted wholly or largely to the wheel 5 (depending on the inefficiency) and the wheel 3 continues to turn at the same speed at the wheel 5.

It will be recognised that the differential described has fewer moving parts and is less susceptible to wear than the worm and wheel differentials. It is however greatly superior to the conventional vehicle differential used on currently made sedan cars sold on the mass market as 'wheel-spin' is avoided. It is also usable in any situation where a drive is to be shared by two loads and it is required to avoid racing of one load when the other load is thrown off.

FIG. 3, as well as showing how the differential of FIGS. 1 and 2 appears in practice with the intermediate shaft replicated around the common axis of the output drive shafts 2 and 4, also shows the direction of rotation of the different members, by means of arrows.

DESCRIPTION OF SECOND EMBODIMENT

In the arrangement of the invention shown in FIG. 4, parts corresponding to those already described with reference to FIGS. 1 and 2 are similarly identified with reference numerals, but the numbers are in the '100' series. The description of these parts will therefore be brief and for a more detailed understanding of them reference should be had to earlier figures.

The drive shaft 106 drives a pinion gear 107 which engages a rim gear 108 on a drive disc 109. The disc 109 is connected by a bar tie 120 to a similar coaxially arranged disc 121. The shaft 102 extends through a bearing in the centre of the disc 121 and is coaxial with the shaft 104, which extends through a bearing (not shown) in the centre of the disc 109.

The members 113, 116 and the gears 112, 117 are arranged between the two discs 109 and 121. The gears 117, 112 have spur gearing as shown. The intermediate shaft 111 extends through a bearing in a strut 122 extending radially inwardly from the tie 120, and is held at its ends in bearings in the discs 121 and 109. The inner part of the strut 122 is formed with bearings respectively supporting a reduced diameter, inner end-portion of the shaft 104, and a shaft 123 of an idler gear 124 which meshes with two gears 125 and 126, arranged at its diametrically opposite sides respectively. The gears 124, 125 and 126 have helical teeth as shown. The gear 125 is fixed to the intermediate shaft 111, and the gear 126 is carried by a spline 127 along which it can be moved to any one of a range of positions by means (not shown).

The members 113 and 116 are of the type described and claimed in our co-pending patent application Ser. No. 07/590,293 filed Sept. 28, 1990.

Such locking members have the property that their teeth are incapable (or can be made virtually incapable of) transmitting drive between the two shafts 104 and 111 but, if they are rotated in the same direction, and at the same speed, and have teeth with the same spiral hand, they will allow the two shafts 111 and 104 to rotate. This results from the spiral teeth formed on the two members 113 and 116 propagating at the same speed in the same direction. The purpose of the axially moveable gear 126 is to control the positions of the spiralling teeth on the members 113 and 116 with respect to one another. This enables the differential gear mechanism to be set to a desired degree of inefficiency.

OPERATION OF SECOND EMBODIMENT

The gear mechanism of FIG. 4 operates as follows.

With the vehicle moving ahead in the direction of the arrows, gear 117 turns counter-clockwise. Member 116 is turned by the other wheel 105 also in a counter-clockwise direction. As the teeth of the members 116, 113 have the same spiral hand, they can only translate over one another if turning in the same direction. However, in the condition under discussion, the members 116, 113 are seeking to turn in opposite directions. As this is not possible, they lock and transmit the input drive of shaft 106 as orbital movement of the shaft 111 around the common axis of the wheels.

If the vehicle corners in a direction which increases the speed of wheel 105 and reduces the speed of wheel 103, the incremental speed changes of the wheels are applied in the same direction to the members 113, 116 causing them to translate over one another and allow the differential movement of the wheels to take place.

The shape and positioning of the teeth on the members 113, 116 is such that they cannot transmit drive between them, or can only do so inefficiently. The degree of inefficiency can be altered by axially displacing the gear 126. This causes the angular relationship of the portions of the shaft 111 on opposite sides of a 'V' joint 140 in the shaft 111 to change, and thus to change the position of the teeth of member 113 with respect to those of member 116. The repositioning of these teeth with respect to one another varies their frictional engagement so that the inefficiency of the differential can be varied, in a controlled manner, to any chosen value between zero and 100%. The joint 140 may comprise a clutch with interengaging V-shaped teeth.

The controlled repositioning of the gear 126 on the spline 127 also produces a phase change in the differential so that it can be changed from a standard mode of operation as described, to a fully locking, torque-sensing differential, or to any other mode between the two at which a chosen degree of differential operation is required. It will be noticed that all of the shafts in the arrangement of FIG. 4 are parallel to one another. It is not essential that the gears 117 and 112 have the same diameter, and a speed ratio other than 1:1 can be chosen. This is particularly useful if the mechanism is interposed in a drive train extending from an engine to the front, and rear wheel differentials of a four-wheel drive vehicle. Such an arrangement is described later, with reference to FIG. 8.

Figure 4:
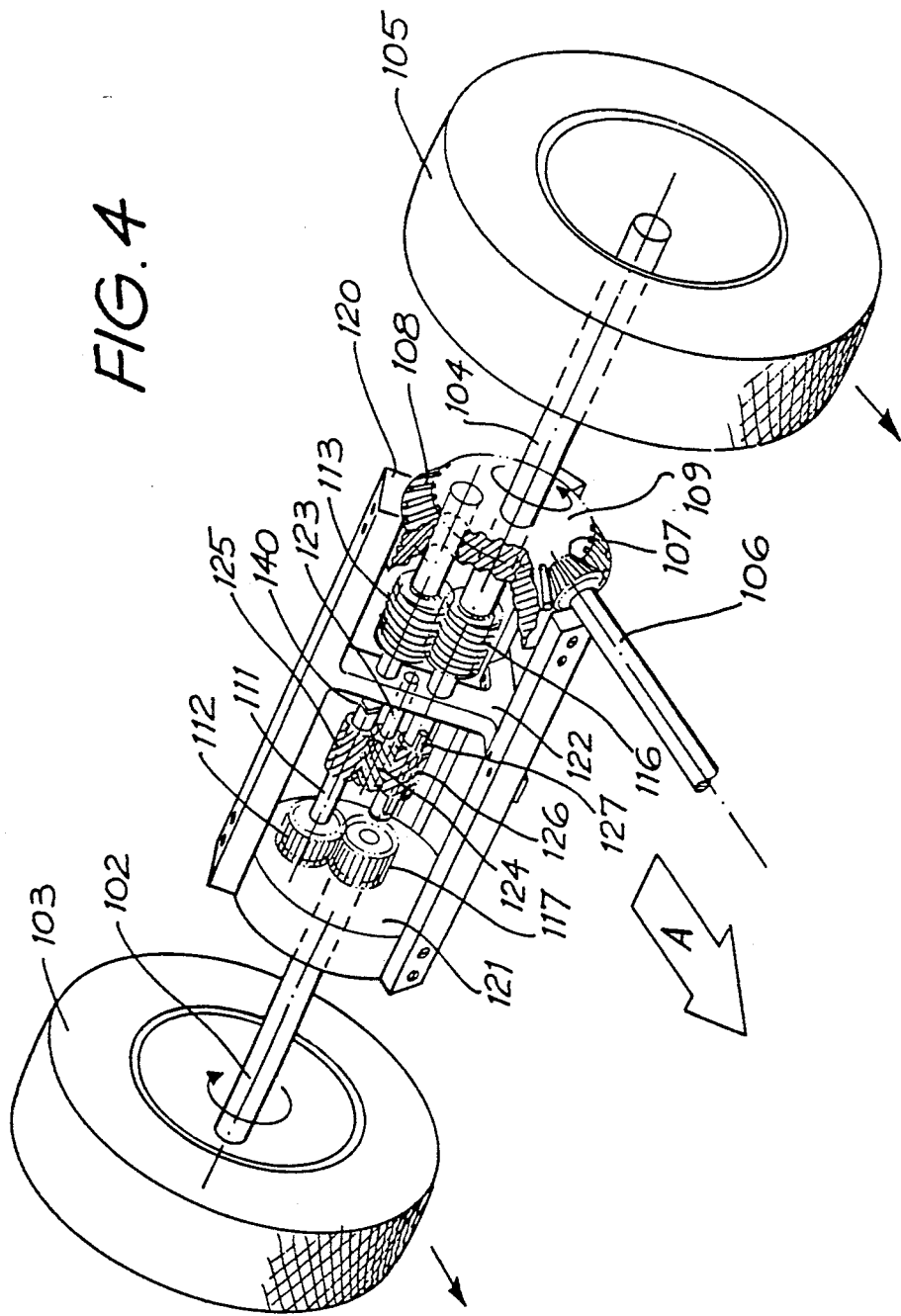
FIG. 4 is a perspective and partially broken-away view of a second embodiment of the invention.

The gears 124, 125 and 126 are not essential for the operation of the mechanism shown in FIG. 4. Their sole purpose is to allow the phase displacement between the teeth of the members 113 and 116 to be varied so that the characteristics of the mechanism can be changed. For example, the locking members 113 and 116 can have spiralling teeth of asymmetrical cross-section as is described in the complete specification of our co-pending Australian application No. PJ 6633 filed on even date herewith and entitled "Meshing Gears" (hereby inserted by way of reference). Foreign counterparts of the complete specification have been filed in some countries on the same date as the present application. Such gears resemble overlapping lead screw members with the trailing and leading flank surface of the teeth of different gradients. The steeper gradient flank surfaces and the pitch of the spiralling convolutions of the teeth are so arranged that rotation of one of the lead screw members in one direction causes its teeth to slide against the teeth of the other lead screw member to impart to it an axial thrust which is converted by the pitch of the teeth into a rotational torque causing the other lead screw member to rotate in the same direction. The result is a combination of two meshing lead screw members which rotate in the same direction when drive is imparted in one direction to one of them, despite they being in mesh. If the direction of rotation is reversed however, for example by braking of the vehicle, shallower gradient flank surfaces provided on one flank of each of the teeth, bear on one another to lock the members together. This particular arrangement has advantages when incorporated into a differential of a high performance vehicle such as a racing car, as these require the differential to operate in a non-locked mode during braking, and in a locked or highly inefficient mode when accelerating.

If both flank surfaces of all the teeth have the same gradient, the positioning of the gear 126 can be used to alter the pressure between the tooth convolutions of the two locking members. This enables the behavioural characteristics of the differential gearing to be changed.

DESCRIPTION OF THIRD EMBODIMENT

Figure 8:
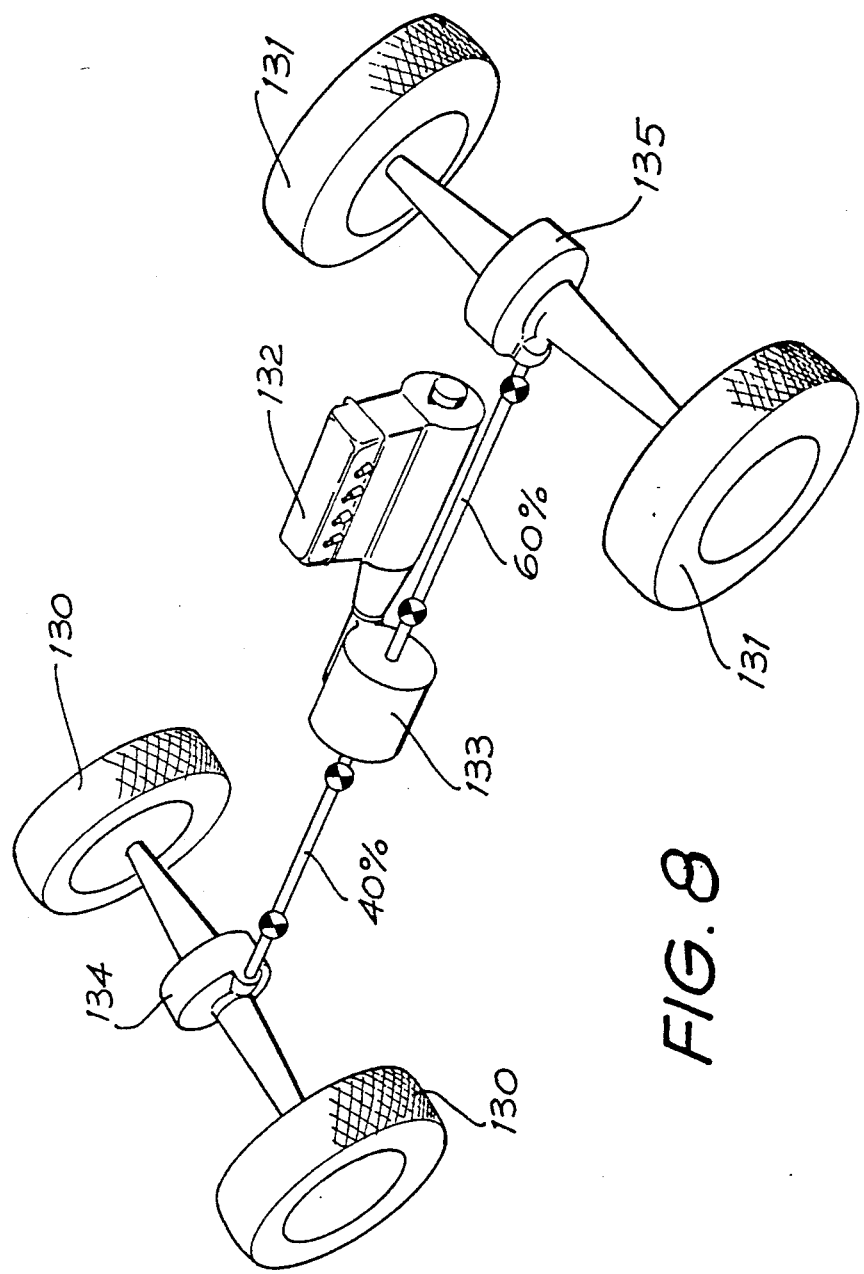
FIG. 8 is a plan schematic arrangement of a power drive system for a four wheel drive vehicle and using the invention as a torque splitter in the drive chain of the vehicle.

FIG. 8 shows in diagrammatic plan, a 4-wheel drive vehicle having a pair of front wheels 130 and a pair of rear wheels 131. These wheels are powered by an engine 132 driving a power splitting mechanism 133 supplying power to a differential 134 arranged between the front wheels 130 of the vehicle, and a differential 135, arranged between the rear wheels of the vehicle.

The differentials 134 and 135 can be of one of the types described herein. The power splitting mechanism 133 can be of the type shown in FIG. 4, but using different diameter gears 117 and 112 to produce the required torque split between the front and rear axles. For example, the gears 117 and 112 may be chosen to provide 60% of the normal driving torque to the rear wheels and 40% to the front wheels.

MODIFICATION OF THE FIRST EMBODIMENT

Figure 5:
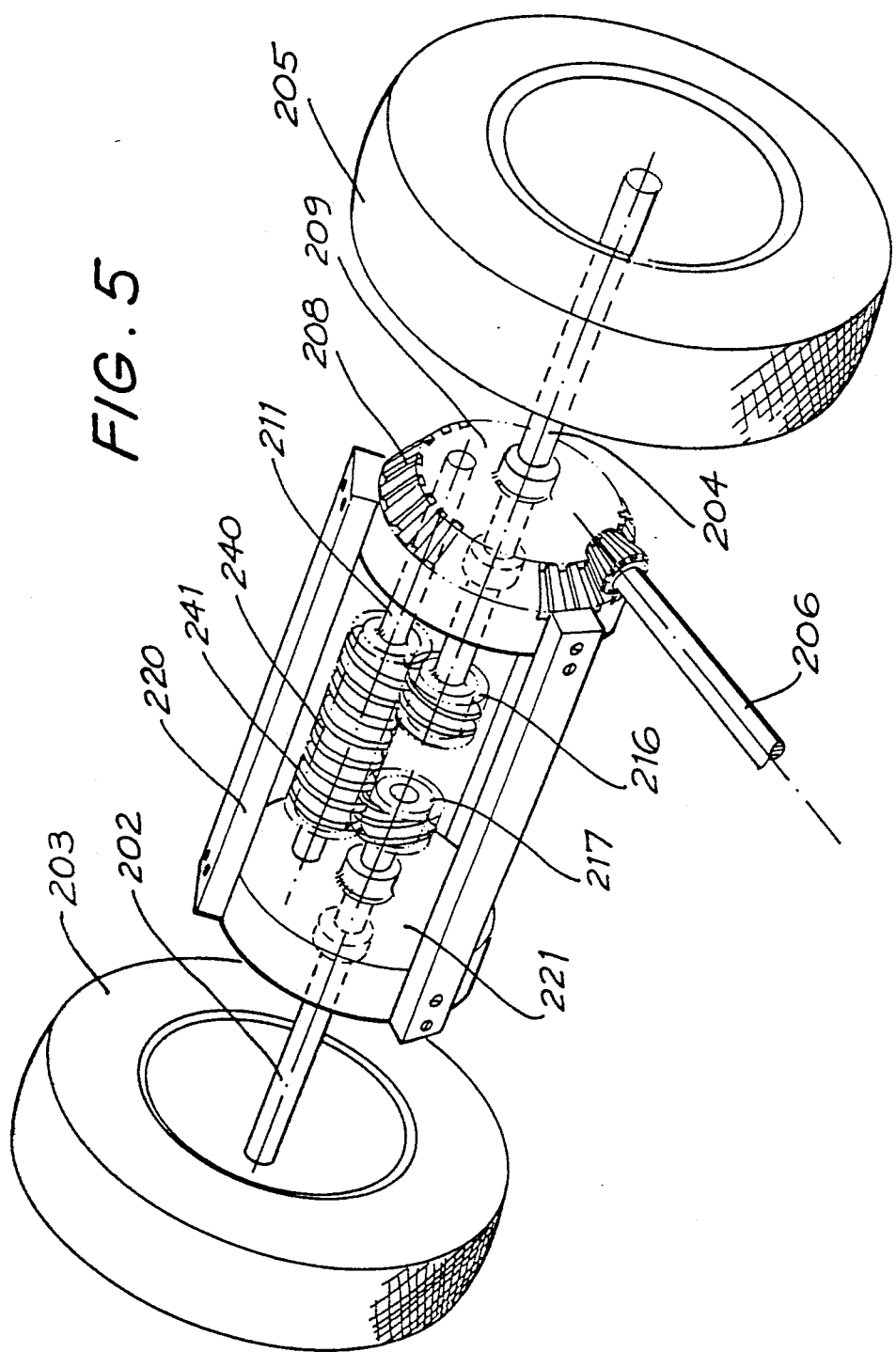
FIG. 5 is a perspective view of a third embodiment of the invention.

FIG. 5 shows a modification of the arrangement shown in FIG. 3, which is of simpler construction. Parts corresponding to those already described in earlier figures carry the same reference numerals but they are in the twohundred series. They will not be again described in detail to avoid needless repetition of description.

The two rotary discs 209 and 221 are driven together by the tie 220. An intermediate shaft 211 is carried at its ends in bearings (not shown) arranged eccentrically in the two discs 221 and 209. It carries a roller 241 having spiral teeth 240 of constant pitch and constant thickness which, at one end, mesh with a spirally-toothed member 217 having one or more teeth and driven by the wheel 203, and at the other end, with the member 216.

The arrangement of FIG. 5 operates similarly to that shown in FIG. 4. Drive from the shaft 206 caused the tie 220 to orbit about the common axis of the shafts 202 and 204. The teeth of the member 216 mesh with teeth 241 spiralling around the roller 240. The meshing teeth of the member 216 and 240 have characteristics of the type already described, namely, they have the same hand of thread and will only turn with respect to one another when the two shafts 211 and 204 are rotated at the same speed and in the same direction. The teeth of the roller 240 engaged with the member 217 are of a design permitting drive transmission in both directions between them, and the roller 240 acts to reverse the drive from the member 217 and member 216. In operation, when the vehicle is travelling along a straight road, member 216 attempts to turn the roller 240 clockwise, while member 217 attempts to turn the roller 240 counterclockwise. The roller 240 therefore does not rotate about its axis. Even if one wheel should skid, wheel spin does not occur because the roller 240 is prevented from rotating freely about its axis. This follows from its teeth having poor driving efficiency with the teeth of the member 216. As a consequence, drive from the shaft 211 to the members 216 and 217 continues to be applied to both wheels, but the major part of the drive torque is applied to the wheel which is retaining ground adhesion.

The differential action of the gear mechanism operates as previously. If one of the wheels 203 slows down and the other wheel 205 speeds up by the same amount, the roller 240 and the member 216 turn in the same direction and at the same speed. This allows the differential action to occur.

FIGS. 6 and 7 show how the arrangement of FIG. 5 is realised in practice. Parts of these figures corresponding to those of FIG. 5 carry the same references. The roller 240 has teeth of the same handed spiral along its length and meshes with the two members 216, 217 at two meshing zones, respectively. As is clearly apparent from FIG. 6, the member 217 has oppositely-handed teeth to the member 216 and the axial thickness of the teeth of members 216, 217 is different. This is necessary in order for the differential to work properly without backlash.

FIG. 7 shows how the rollers 240 are replicated in a common cylindrical casing about the common axis of members 216, 217. It is necessary, with such replication, to observe a particular relationship. The replicated positions of the roller 240 about the common axis of the members 216, 217 must be at certain angularly-spaced locations. These locations must be angularly spaced by 360/x degrees, where "x" is the aggregate of the number of teeth on the two members 216, 217. For example, if one of the members 216, 217 has three teeth and the other member has five teeth, the location at which the roller 240 may be replicated, have to be spaced from one another by 360/8=45 degrees.

We claim:

1. A differential gear mechanism having two output shaft connections turning about a common axis of rotation and interconnected by gearing which includes:

an intermediate rotary member which is uniformly externally helically toothed substantially throughout its length and extends parallel to said common axis;

an input drive connection driving the intermediate rotary member around an orbital path concentric with said common axis;

a first externally toothed output rotary member connected to one of the output shaft connections and meshing with a first portion of the helically toothed intermediate rotary member in a first meshing zone; and a second externally toothed output rotary member connected to the other output shaft connection and meshing with a second portion of the helically toothed intermediate rotary member in a second meshing zone axially spaced from the first zone;

and wherein the teeth of the output rotary members are respectively formed as opposite-handed spirals whereby the output rotary members rotate in opposite directions respectively during rotation of the intermediate rotary member, the teeth in one of the two meshing zones exhibit zero or a low efficiency of drive, and the axial thickness of the helical tooth of one output rotary member is different from the axial thickness of the helical tooth of the other output rotary member whereby backlash in the mechanism is minimized.

2. A mechanism according to claim 1, including means which are adjustable to vary the pressure between the meshing teeth in said one meshing zone and so alter, in a controllable manner, the degree of inefficiency of drive transmission through it.

3. A mechanism according to claim 1, wherein the intermediate rotary member has a single tooth of which the pitch and thickness are uniform along the length of the intermediate rotary member.

4. A mechanism according to claim 1, wherein the first and second output rotary members are axially aligned, whereby they mesh with the helically toothed intermediate rotary member over different respective length segments thereof.

5. A vehicle having two ground-engaging wheels at opposite sides of the vehicle, a drive shaft, a differential gear mechanism disposed between the wheels and having an input drive connection coupled drivingly to said drive shaft and two output shafts coupled drivingly to the two wheels respectively, the two output shafts turning about a common axis of rotation and being interconnected by gearing which includes:

an intermediate rotary member which is uniformly externally helically toothed substantially throughout its length and extends parallel to said common axis;

an input drive connection driving the intermediate rotary member around an orbital path concentric with said common axis;

a first externally toothed output rotary member connected to one of the output shaft connections and meshing with a first portion of the helically toothed intermediate rotary member in a first meshing zone; and a second externally toothed output rotary member connected to the other output shaft connection and meshing with a second portion of the helically toothed intermediate rotary member in a second meshing zone;

and wherein the teeth of the output rotary members are respectively formed as opposite-handed spirals whereby the output rotary members rotate in opposite directions respectively during rotation of the intermediate rotary member, the teeth in one of the two meshing zones exhibit zero or a low efficiency of drive, and the axial thickness of the helical tooth of one output rotary member is different from the axial thickness of the helical tooth of the other output rotary member whereby backlash in the mechanism is minimized.

6. A vehicle having a pair of front wheels, a front differential having two output shafts connected drivingly to the front wheels respectively and also having an input shaft, a pair of rear wheels, a rear differential having two output shafts connected to the rear wheels respectively and also having an input shaft, and a differential gear mechanism having two output shafts connected respectively to the input shaft of the front differential and the input shaft of the rear differential, the two output shafts turning about a common axis of rotation and being interconnected by gearing which includes:

an intermediate rotary member which is uniformly externally helically toothed substantially throughout its length and extends parallel to said common axis;

an input drive connection driving the intermediate rotary member around an orbital path concentric with said common axis;

a first externally toothed output rotary member connected to one of the output shaft connections and meshing with a first portion of the helically toothed intermediate rotary member in a first meshing zone; and a second externally toothed output rotary member connected to the other output shaft connection and meshing with a second portion of the helically toothed intermediate rotary member in a second meshing zone axially spaced from the first zone;

and wherein the teeth of the output rotary members are respectively formed as opposite-handed spirals whereby the output rotary members rotate in opposite directions respectively during rotation of the intermediate rotary member, the teeth in one of the two meshing zones exhibit zero or a low efficiency of drive, and the axial thickness of the helical tooth of one output rotary member is different from the axial thickness of the helical tooth of the other output rotary member whereby backlash in the mechanism is minimized.

7. A differential gear mechanism having two output shaft connections turning about a common axis of rotation and interconnected by gearing which includes:

an intermediate rotary member which extends parallel to said common axis and is uniformly externally helically toothed over each of first and second segments of its length;

an input drive connection driving the intermediate rotary member around an orbital path concentric with said common axis;

a first externally toothed output rotary member connected to one of the output shaft connections and meshing with said first segment of the helically toothed intermediate rotary member in a first meshing zone; and a second externally toothed output rotary member connected to the other output shaft connection and meshing with said second segment of the helically toothed intermediate rotary member in a second meshing zone;

and wherein the teeth of the output rotary members are respectively formed as opposite-handed spirals whereby the output rotary members rotate in opposite directions respectively during rotation of the intermediate rotary member, the teeth in one of the two meshing zones exhibit zero or a low efficiency of drive, and the axial thickness of the helical tooth of one output rotary member is different from the axial thickness of the helical tooth of the other output rotary member whereby backlash in the mechanism is minimized.

8. A mechanism according to claim 7, including means which are adjustable to vary the pressure between the meshing teeth in said one meshing zone and so alter, in a controllable manner, the degree of inefficiency of drive transmission through it.

9. A mechanism according to claim 7, wherein the intermediate rotary member has a single tooth of which the pitch and thickness are uniform along the first and second segments of the length of the intermediate rotary member.

10. A mechanism according to claim 7, wherein the first and second output rotary members are axially aligned.

* * * * *